Dec. 3, 1963     J. TAY     3,112,576
AUDIBLE FISH LURES
Filed June 25, 1962

INVENTOR.
JOHN TAY
*John Tay*

United States Patent Office 3,112,576
Patented Dec. 3, 1963

3,112,576
AUDIBLE FISH LURES
John Tay, 1745 Bradshaw Lane, St. Petersburg 10, Fla.
Filed June 25, 1962, Ser. No. 204,995
1 Claim. (Cl. 43—42.14)

This invention relates to Audible Fish Lures adapted to be attached to a fishing line, which may be used with a rod or pole or trolled from a boat.

An object of the invention is to provide a lure which, when drawn through water will create a chirping or clicking sound that will resemble that made by an insect. Another object is to make the lure attractive visually to a fish, in combination with sound.

Another object is to produce such a device that is rugged in structure and not easily bent or damaged.

To these and other ends the invention comprises parts and arrangements thereof about to be described, and understandable by those familar with fish lures in general, when considered in connection with the appended claim and the drawing in which FIG. 1 is a side view of the entire lure;

Figure 1:
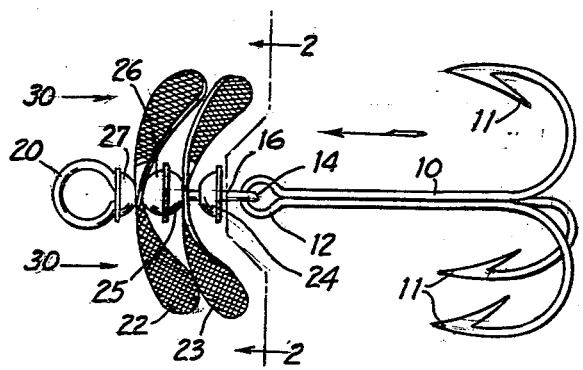
Figure 2:
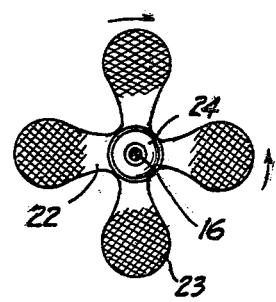
FIG. 2 is an end view of a pair of spinners.
Figure 3:
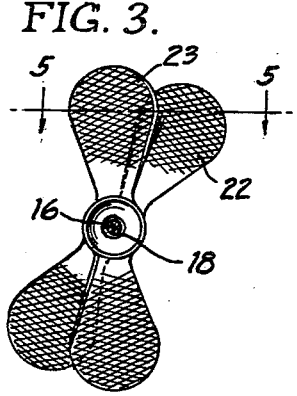
FIG. 3 is an enlarged view similar to FIG. 2, showing two parts engaging each other in passing.
Figure 4:
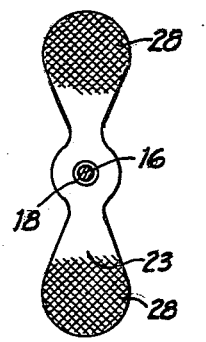
FIG. 4 is a face view of one spinner.

In the present showing of the invention a gang hook 11 on a shank 10 has an eye 12 at its forward end engaging one end of a shaft 16. On this shaft two or more spinners 22, 23 of propeller type are mounted, freely revoluble, one being hight-hand and the other of left-hand pitch, which means that when dragged through water they will spin in opposite directions. The spinners therefore will tend to move toward each other along shaft 16, if they are correctly mounted thereon.

If the spinners have central apertures that are a close fit on shaft 16, when they contact each other they will be stalled, and neither will rotate. To overcome this condition and to permit the spinners to strike and then glance off, the central holes 18 are made considerably larger than the shaft diameter.

Figure 6:
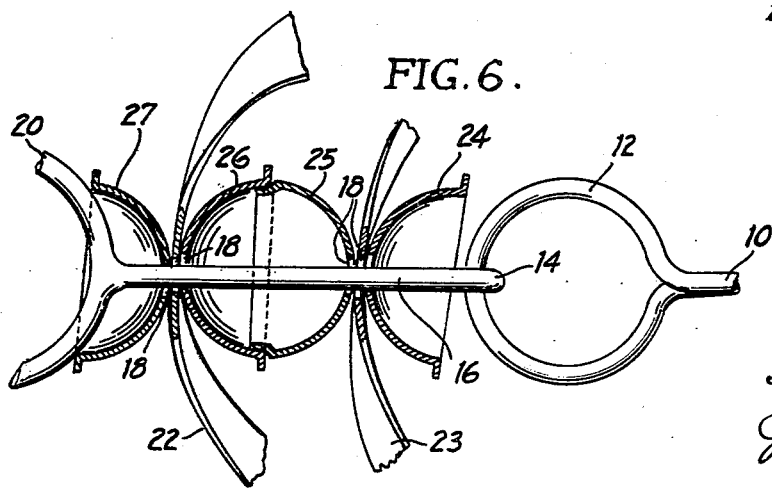
FIG. 6 is an enlarged view similar to FIG. 1, showing the spinners displaced in use from their normal relation.

Between the spinners and behind and in front thereof, are spacers or separators which will prevent the spinners jamming each other. These separators, 24, 25, 26, 27, are in the form of half-balls or beads having the necessary dimensions as above mentioned. Because of the central bores in the beads being larger than the shaft 16, the beads may also tilt to a considerable angle as indicated in FIG. 6.

Figure 5:
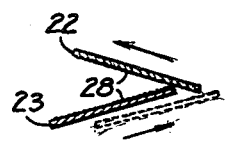
FIG. 5 is a section of spinner blades making contact.

As the spinners rotate oppositely their blades will strike at a glancing angle to each other (FIG. 5) which will not stall the blades, but each time one blade strikes against a blade on the other, it will give out a sharp "click," and thus the effect of the lure as it is trolled along resembles the chirp of a cricket or similar insect or creature.

Figure 7:
FIG. 7 is an enlarged cross section of a spinner blade indicating roughening or knurling thereof for reasons to be described.

To further enhance this chirping effect and also to create a more scintillating visual appearance, the faces of the blades may be knurled or serrated as shown, the serrations being not too sharp but may be rather shallow and of slightly angularity (FIG. 7). Thus they cannot stall and become inoperative.

This lure has been found, when in actual use, to operate as above described, and is very effective in attracting fish. The features and combination of parts that are considered new and useful are set forth in the claim appended hereto.

I claim:

An audible fish lure comprising a rigid shaft attachable to a fish line and carrying oppositely-pitched propeller-like spinners and spacers between the spinners, the spinners and spacers having central apertures substantially greater than the thickness of the shaft to permit the spinners and spacers to tilt from positions at right angles to the shaft to positions other than at right angles to the shaft, each of said spinners having blades curved in an axial direction rearwardly a distance greater than the axial length of each spacer whereby as the spinners rotate the blades of adjacent spinners will rotate in planes other than at right angles to the shaft and strike and deflect from each other during rotation and produce a clicking sound.

References Cited in the file of this patent

UNITED STATES PATENTS

| 143,146 | Harper et al. | Sept. 23, 1873 |
| 1,620,972 | Hobbs | Mar. 15, 1927 |
| 1,842,127 | Stickel et al. | Jan. 19, 1932 |
| 2,501,103 | Slater | Mar. 31, 1950 |
| 2,902,791 | Woodley | Sept. 8, 1959 |
| 2,977,705 | Busnel | Apr. 4, 1961 |
| 3,000,130 | Pankuch | Sept. 19, 1961 |